J. S. & T. B. ATTERBURY.
Lamp.

No. 164,669.

Patented June 22, 1875.

Witnesses.

Inventors.

UNITED STATES PATENT OFFICE.

JAMES S. ATTERBURY AND THOMAS B. ATTERBURY, OF PITTSBURG, PA.

IMPROVEMENT IN LAMPS.

Specification forming part of Letters Patent No. 164,669, dated June 22, 1875; application filed April 19, 1875.

*To all whom it may concern:*

Be it known that we, JAMES S. ATTERBURY and THOMAS B. ATTERBURY, of Pittsburg, county of Allegheny and State of Pennsylvania, have invented a new and Improved Glass Lamp, or other articles having a foot and a bowl; and we do hereby declare that the following is a full, clear, and exact description thereof, reference being had to the accompanying drawing making part of this specification, in which—

Figure 1:
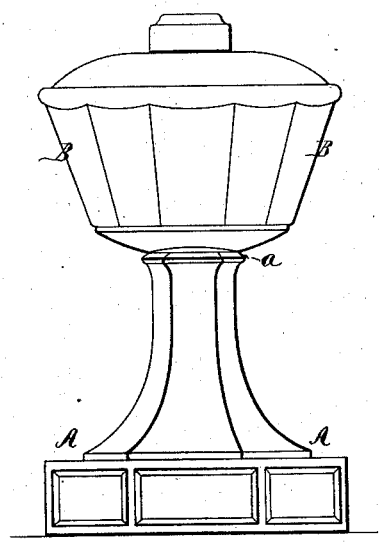
Figure 2:
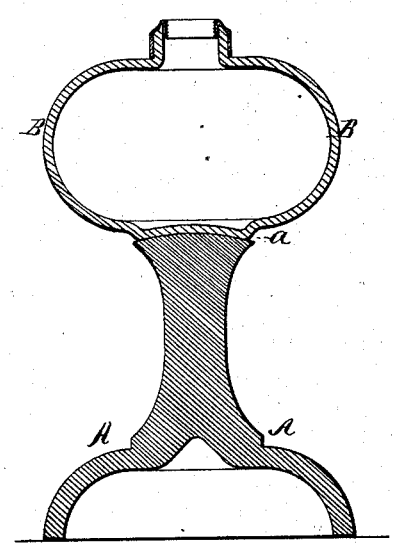

Figure 1 is a side elevation of our improved lamp. Fig. 2 is a section of the same, the foot or stand and bowl being of a different shape from that shown in Fig. 1.

The nature of our invention consists in a new manufacture, viz., a glass lamp or other glass article having its bowl made of clear or transparent glass, and its foot of pressed opal, white, or colored glass, and the foot and bowl held together by the union of the glass of the bowl with the glass of the foot.

In the accompanying drawings, A represents the opal or white or colored pressed glass foot, and B the clear or transparent glass bowl of a lamp. The foot A is united at *a* to the bowl B while the parts are hot, or during the process of manufacturing the article, and while the two kinds of glass composing the respective parts are capable of assuming a relation to one another when brought together, which, when the parts cool, will insure their holding firmly together.

The upper end of the standard is finished with a rounded or curved form, so that when the clear glass bowl is blown upon this curved top the contraction and expansion have not to be contended with, as in the case of the concave of a shell or cup.

Heretofore opal or white or colored glass feet or stands have been united with bowls by means of a metallic socket, and by means of cement. Transparent or clear glass stands, and similar glass bowls, have been made; but we are not aware that a lamp with an opal or white glass stand and clear glass bowl has ever before been made and united together without a brass socket or cement.

Lamps, such as herein described, are much cheaper than those with metal sockets, as the joints are not liable to become loose, and allow the bowl and stand to separate. The saving is very great to the manufacturer, and they can be put upon the market at thirty per cent. less than those made with brass sockets or cement joints.

We do not claim a process of uniting parts made of glass.

Prior to our present invention it had been proposed to unite opal glass with clear glass in the manufacture of pickle-dishes; also, to unite these two kinds of glass in the manufacture of lamps. But in both cases the invention which is shown in our present case is not found, for the reason that we now terminate the upper end of the foot or standard with a rounded convex form, and of a diameter much less than that of the bowl of the lamp, for the purpose of overcoming the inconveniences resulting from unequal expansion or contraction of the foot and bowl.

What we claim is—

The article of glassware having a pressed glass foot or standard terminated with a rounded convex form at its upper end, and a glass bowl blown upon said rounded end of the foot, the article thus produced being solely of glass, and the requisite tight joint formed by a union of the glass, as set forth.

JAMES S. ATTERBURY.
THOS. B. ATTERBURY.

Witnesses:
THOS. C. PEARS,
DANIEL WENKE, Jr.